(12) United States Patent
Park et al.

(10) Patent No.: US 11,916,696 B2
(45) Date of Patent: Feb. 27, 2024

(54) ELECTRONIC DEVICE INCLUDING USB CONNECTING TERMINAL AND METHOD OF OPERATION THEREOF

(71) Applicant: Samsung Electronics Co., Ltd., Gyeonggi-do (KR)

(72) Inventors: Namhee Park, Gyeonggi-do (KR); Wookwang Lee, Gyeonggi-do (KR); Seungjoon Kim, Gyeonggi-do (KR); Yanghee Lee, Gyeonggi-do (KR); Youngmin Park, Gyeonggi-do (KR); Jaehyuk Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 17/742,456

(22) Filed: May 12, 2022

(65) Prior Publication Data

US 2022/0368560 A1   Nov. 17, 2022

Related U.S. Application Data

(63) Continuation of application No. PCT/KR2022/005967, filed on Apr. 26, 2022.

(30) Foreign Application Priority Data

May 12, 2021 (KR) .................. 10-2021-0061503

(51) Int. Cl.
*H04L 12/40* (2006.01)
(52) U.S. Cl.
CPC .. *H04L 12/40123* (2013.01); *H04L 12/40078* (2013.01); *H04L 2012/40273* (2013.01)

(58) Field of Classification Search
CPC ......... H04L 12/40123; H04L 12/40078; H04L 2012/40273
See application file for complete search history.

(56) References Cited

U.S. PATENT DOCUMENTS

| 8,725,909 | B2 | 5/2014 | Lu et al. |
| 8,880,752 | B2 | 11/2014 | Hess |
| 9,344,134 | B2 | 5/2016 | Li et al. |
| 9,715,271 | B2 | 7/2017 | Kaestner |

(Continued)

FOREIGN PATENT DOCUMENTS

| KR | 10-0742702 B1 | 7/2007 |
| KR | 10-2015-0021797 A | 3/2015 |

(Continued)

OTHER PUBLICATIONS

International Search Report dated Aug. 4, 2022.

*Primary Examiner* — Henry Tsai
*Assistant Examiner* — Christopher A Daley
(74) *Attorney, Agent, or Firm* — Cha & Reiter, LLC

(57) ABSTRACT

According to an embodiment, an electronic device comprises: a connecting terminal; a memory; and a processor connected to the connecting terminal and the memory, wherein the processor is configured to: identify a head unit of a vehicle connected to the connecting terminal; obtain information about a model of a vehicle or an installed operating system, associated with the identified head unit; and when the information about a specified tuning value for the identified head unit is stored in the memory, tune a register by using the specified tuning value.

20 Claims, 10 Drawing Sheets

(56) References Cited

U.S. PATENT DOCUMENTS

| | | | |
|---|---|---|---|
| 10,198,387 B2* | 2/2019 | Chung | G06F 13/385 |
| 10,491,219 B2* | 11/2019 | Seo | G06F 1/10 |
| 11,009,930 B2* | 5/2021 | Hunt | G06F 13/4282 |
| 2011/0075761 A1* | 3/2011 | Kuwata | H04L 25/0272 |
| | | | 375/295 |
| 2012/0271979 A1* | 10/2012 | Considine | G06F 13/36 |
| | | | 710/306 |
| 2013/0229211 A1* | 9/2013 | Nishiyama | H03L 7/0814 |
| | | | 327/146 |
| 2013/0297835 A1 | 11/2013 | Cho | |
| 2013/0332632 A1* | 12/2013 | Rathi | H04W 12/069 |
| | | | 710/38 |
| 2015/0172845 A1* | 6/2015 | Park | H04W 12/068 |
| | | | 455/414.1 |
| 2017/0126703 A1* | 5/2017 | Ujiie | H04L 67/12 |
| 2018/0060251 A1* | 3/2018 | You | G06F 13/4295 |
| 2018/0060262 A1* | 3/2018 | Kim | G06F 13/4022 |
| 2019/0080526 A1* | 3/2019 | Shin | G07C 5/085 |
| 2021/0055777 A1 | 2/2021 | Regupathy et al. | |
| 2022/0021563 A1* | 1/2022 | Hirata | H04L 25/03885 |

FOREIGN PATENT DOCUMENTS

| | | |
|---|---|---|
| KR | 10-2015-0069907 A | 6/2015 |
| KR | 10-2017-0001475 A | 1/2017 |
| KR | 10-2017-0003523 A | 1/2017 |
| KR | 10-2017-0008095 A | 1/2017 |
| KR | 10-1969726 B1 | 4/2019 |
| KR | 10-2026093 B1 | 9/2019 |

* cited by examiner

| | | AC | TX_PRE_EMP_AMP_TUNE | | | |
|---|---|---|---|---|---|---|
| | DC | HEX | 8mA | 6mA | 4mA(default) | 2mA |
| TX_VREF_TUNE | 506.8mV(+26.70%) | 0x0F | 0x00 | 0xC0 | 0x80 | 0x40 |
| | +24.30% | 0x0E | 0x0F | 0xCF | 0x8F | 0x4F |
| | +22.20% | 0x0D | 0x0E | 0xCE | 0x8E | 0x4E |
| | +20.00% | 0x0C | 0x0D | 0xCD | 0x8D | 0x4D |
| | +17.80% | 0x0B | 0x0C | 0xCC | 0x8C | 0x4C |
| | +15.60% | 0x0A | 0x0B | 0xCB | 0x8B | 0x4B |
| | +13.30% | 0x09 | 0x0A | 0xCA | 0x8A | 0x4A |
| | +11.10% | 0x08 | 0x09 | 0xC9 | 0x89 | 0x49 |
| | +8.90% | 0x07 | 0x08 | 0xC8 | 0x88 | 0x48 |
| | +6.50% | 0x06 | 0x07 | 0xC7 | 0x87 | 0x47 |
| | +4.40% | 0x05 | 0x06 | 0xC6 | 0x86 | 0x46 |
| | +2.30% | 0x04 | 0x05 | 0xC5 | 0x85 | 0x45 |
| | 400mV(default) | 0x03 | 0x04 | 0xC4 | 0x84 | 0x44 |
| | -2.20% | 0x02 | 0x03 | 0xC3 | 0x83 | 0x43 |
| | -4.40% | 0x01 | 0x02 | 0xC2 | 0x82 | 0x42 |
| | -6.60% | 0x00 | 0x01 | 0xC1 | 0x81 | 0x41 |
| | | | 0x00 | 0xC0 | 0x80 | 0x40 |

| TXRESTUNE | | | | | |
|---|---|---|---|---|---|
| impedance | 6.1Ω | | 2.6Ω | 0Ω | 2.3Ω |
| HEX | 0x0 | | 0x1 | 0x2 | 0x3 |

FIG.7

| TX_VREF_TUNE DC | AC HEX | TX_PRE_EMP_AMP_TUNE 8mA 0x00 | | 6mA 0xC0 | | 4mA(default) 0x80 | | 2mA 0x40 | |
|---|---|---|---|---|---|---|---|---|---|
| 506.8mV(+26.70%) | 0x0F | 0x0F | 19.14 | 0xCF | 17.14 | 0x8F | 15.14 | 0x4F | 13.14 |
| +24.30% | 0x0E | 0x0E | 18.93 | 0xCE | 16.93 | 0x8E | 14.93 | 0x4E | 12.93 |
| +22.20% | 0x0D | 0x0D | 18.74 | 0xCD | 16.74 | 0x8D | 14.74 | 0x4D | 12.74 |
| +20.00% | 0x0C | 0x0C | 18.55 | 0xCC | 16.55 | 0x8C | 14.55 | 0x4C | 12.55 |
| +17.80% | 0x0B | 0x0B | 18.36 | 0xCB | 16.36 | 0x8B | 14.36 | 0x4B | 12.36 |
| +15.60% | 0x0A | 0x0A | 18.16 | 0xCA | 16.16 | 0x8A | 14.16 | 0x4A | 12.16 |
| +13.30% | 0x09 | 0x09 | 17.96 | 0xC9 | 15.96 | 0x89 | 13.96 | 0x49 | 11.96 |
| +11.10% | 0x08 | 0x08 | 17.77 | 0xC8 | 15.77 | 0x88 | 13.77 | 0x48 | 11.77 |
| +8.90% | 0x07 | 0x07 | 17.57 | 0xC7 | 15.57 | 0x87 | 13.57 | 0x47 | 11.57 |
| +6.50% | 0x06 | 0x06 | 17.36 | 0xC6 | 15.36 | 0x86 | 13.36 | 0x46 | 11.36 |
| +4.40% | 0x05 | 0x05 | 17.18 | 0xC5 | 15.18 | 0x85 | 13.18 | 0x45 | 11.18 |
| +2.30% | 0x04 | 0x04 | 16.99 | 0xC4 | 14.99 | 0x84 | 12.99 | 0x44 | 10.99 |
| 400mV(default) | 0x03 | 0x03 | 16.79 | 0xC3 | 14.79 | 0x83 | 12.79 | 0x43 | 10.79 |
| -2.20% | 0x02 | 0x02 | 16.60 | 0xC2 | 14.60 | 0x82 | 12.60 | 0x42 | 10.60 |
| -4.40% | 0x01 | 0x01 | 16.40 | 0xC1 | 14.40 | 0x81 | 12.40 | 0x41 | 10.40 |
| -6.60% | 0x00 | 0x00 | 16.21 | 0xC0 | 14.21 | 0x80 | 12.21 | 0x40 | 10.21 |

| HEX | 0x0F | 0x4F | 0x84 |
|---|---|---|---|
| TX EYE | | | |
| Rising time | 662.810ps | 776.180ps | 900.440ps |
| Falling time | 680.610ps | 789.170ps | 923.140ps |

FIG.9

ELECTRONIC DEVICE INCLUDING USB CONNECTING TERMINAL AND METHOD OF OPERATION THEREOF

CROSS-REFERENCE TO RELATED APPLICATION(S)

This application is a continuation of International Application No. PCT/KR2022/005967, filed on Apr. 26, 2022, which claims priority Korean Patent Application No. 10-2021-0061503, filed on May 12, 2021, in the Korean Intellectual Property Office, the disclosure of which are incorporated by reference herein their entirety.

BACKGROUND

Technical Field

Certain embodiments of the disclosure relate to an electronic device including a USB connecting terminal and an operating method thereof.

Description of Related Art

A universal serial bus (USB) is a wired interface for supporting a connection between a host device and a client device. The USB may be a high-speed interface that communicates by generating signal data using a differential signal. A differential signal is based on the difference in voltage levels of D+ and D−. Two devices may be connected to each other by using a cable through the differential signal. One is a USB host and the other is a USB client. The two devices may communicate with each other. Because the stability of a wired connection is poor, the connection may disconnect or fail.

When using a terminal of a smartphone as a client device in connection with a vehicle's head unit while an operating system (e.g., Android Auto or the like) is mounted on the vehicle's head unit, the stability of a USB connection between the head unit and the terminal may be important. Even though the signal quality of the client device is important in the USB connection, the signal quality may not be guaranteed depending on a host device that is a counterpart to be connected.

For example, the head unit may communicate with the terminal through USB 2.0 specification. The USB 2.0 communication may use a differential signal method. Accordingly, when there is noise between the connected devices, the communication may be unstable.

Accordingly, it may be beneficial to provide stable bidirectional communication in the USB communication between the vehicle's head unit and a smartphone terminal.

SUMMARY

According to an embodiment, an electronic device comprises: a connecting terminal; a memory; and a processor connected to the connecting terminal and the memory, wherein the processor is configured to: identify a head unit of a vehicle connected to the connecting terminal; obtain information about a model of a vehicle or an installed operating system, associated with the identified head unit; and when the information about a specified tuning value for the identified head unit is stored in the memory, tune a register by using the specified tuning value. According to an embodiment, a method in an electronic device comprises: identifying a head unit of a vehicle connected to a connecting terminal of the electronic device; obtaining information about a type of the head unit; and when the information about a specified tuning value associated with the type of the head unit is stored in a memory, tuning a register by using the specified tuning value.

BRIEF DESCRIPTION OF THE DRAWINGS

FIG. 7 is a table illustrating an example of a tuning value of an electronic device, according to an embodiment.

FIG. 9 is a diagram for describing an effect of an electronic device, according to an embodiment.

With regard to description of drawings, the same or similar components will be marked by the same or similar reference signs.

DETAILED DESCRIPTION

According to certain embodiments of the disclosure, it is possible to provide an electronic device that supports stable bidirectional communication in a USB communication between a vehicle's head unit and a smartphone terminal, and an operating method thereof.

According to certain embodiments of the disclosure, an electronic device may increase connection stability and may reduce additional current consumption by adjusting a tuning value related to impedance.

Additionally, a variety of additional features may be provided as will be understood through the specification in conjunction with the attached drawings.

Hereinafter, certain embodiments of the disclosure will be described with reference to accompanying drawings. However, those of ordinary skill in the art will recognize that modification, equivalent, and/or alternative on certain embodiments described herein may be variously made without departing from the scope and spirit of the disclosure.

The disclosure will begin by describing one embodiment of an electronic device 101.

Electronic Device

Figure 1:
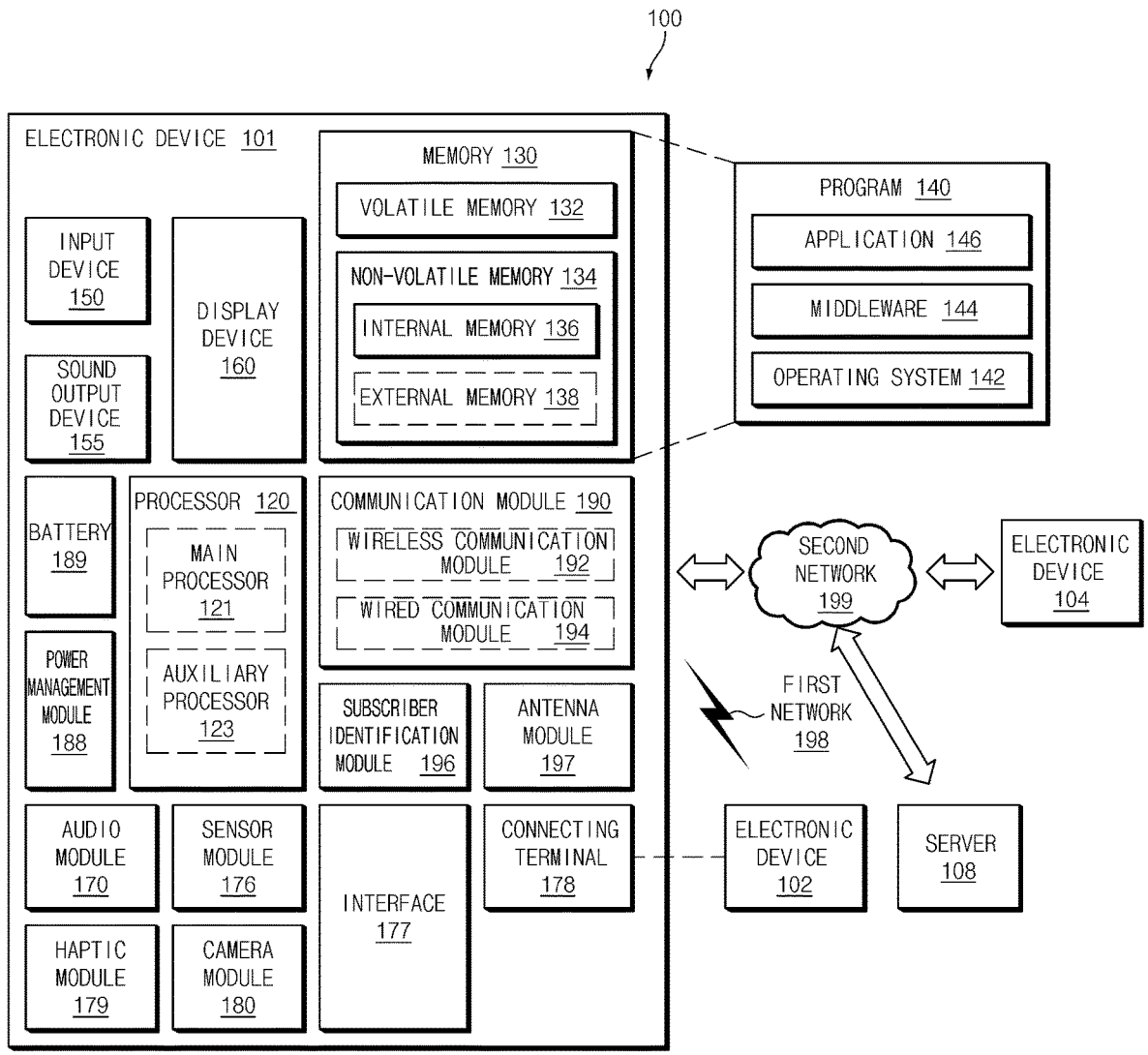
FIG. 1 is a block diagram of an electronic device in a network environment, according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The term "processor" shall be understood in this disclosure to refer to both the singular and plural contexts.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The electronic device 101 can be connected to a host device with a universal serial bus (USB). The USB is a wired interface that communicates by generating signal data using a differential signal. A differential signal is based on the difference in voltage levels of D+ and D−. Two devices may be connected to each other by using a cable through the differential signal. One is a USB host and the other is a USB client. The two devices may communicate with each other. Because the stability of a wired connection is poor, the connection may disconnect or fail.

When using the electronic device 101 (or client device) in connection with a vehicle's head unit while an operating system (e.g., Android Auto or the like) is mounted on the vehicle's head unit, the stability of a USB connection between the head unit and the electronic device 101 may be important. Even though the signal quality of the client device is important in the USB connection, the signal quality may not be guaranteed depending on the host device.

For example, the vehicle's head unit may communicate with the electronic device 101 through USB 2.0 specification. The USB 2.0 communication may use a differential signal method. Accordingly, when there is noise between the connected devices, the communication may be unstable.

Hereinafter, an operation of an electronic device according to an embodiment will be described with reference to FIGS. 2, 3 and 4.

Figure 2:
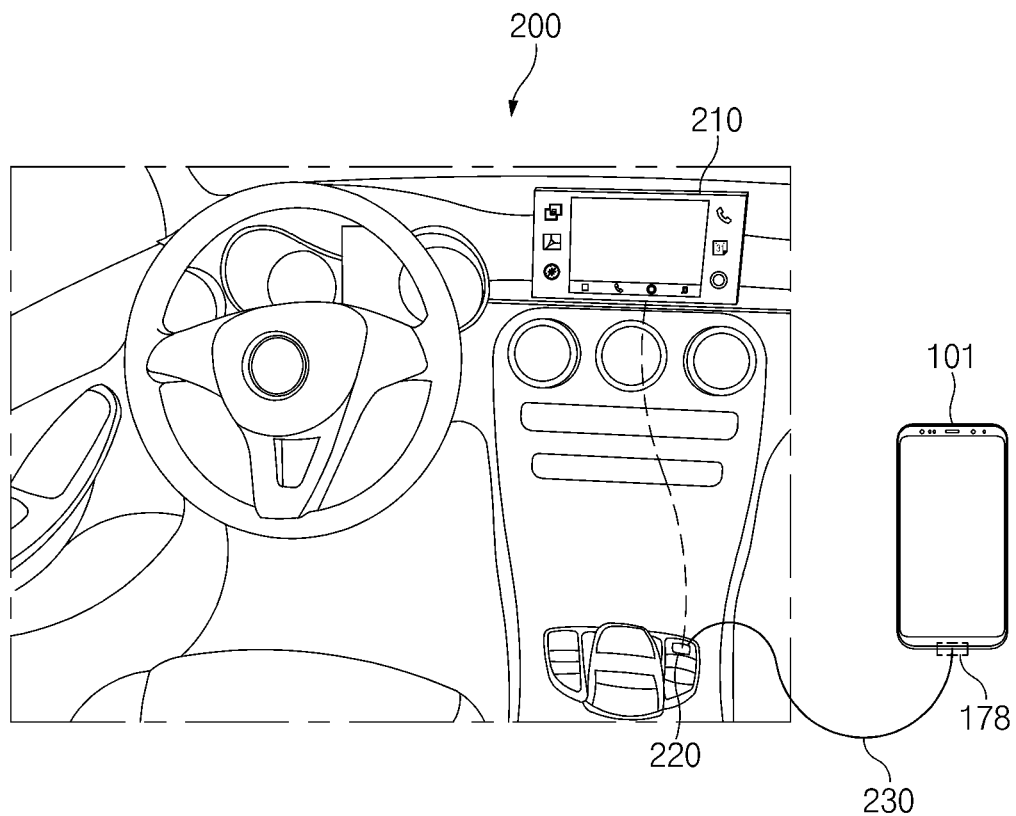
FIG. 2 is a diagram illustrating a state where an electronic device is connected to a head unit of a vehicle, according to an embodiment.

FIG. 2 is a diagram 200 illustrating a state where an electronic device is connected to a head unit of a vehicle, according to an embodiment. FIG. 3 is a block diagram 300 illustrating a state where an electronic device is connected to a head unit of a vehicle, according to an embodiment. FIG. 4 is a diagram 400 illustrating a communication state between an electronic device and a head unit of a vehicle, according to an embodiment. The same configurations as those of this specification may be referenced by the same reference numerals, and description thereof may be omitted.

Referring to FIG. 2, the electronic device 101 (e.g., the electronic device 101 of FIG. 1) according to an embodiment may include a client connecting terminal 178 (or first connecting terminal 178) (e.g., the connecting terminal 178 of FIG. 1). According to an embodiment, the connecting terminal 178 may be a USB connecting terminal. The client connecting terminal 178 of the electronic device 101 may be connected to a connecting terminal 220 of a vehicle (vehicle connecting terminal 220) (or second connecting terminal 220) through a cable 230.

A vehicle may include the vehicle connecting terminal 220. The vehicle connecting terminal 220 may be a USB connecting terminal. The vehicle connecting terminal 220 may be an interface for connecting an external electronic device (e.g., the electronic device 101) to a head unit 210 of the vehicle. The vehicle may include a head unit 210. The head unit 210 may support a connection to the external electronic device (e.g., the electronic device 101) by including an operating system (e.g., Android Auto or the like).

The head unit 210 can include a display that is mounted on the dashboard of a vehicle that provides a user interface for various information to the driver, such as, information about the vehicle, navigation, and control of audio entertainment.

Figure 3:
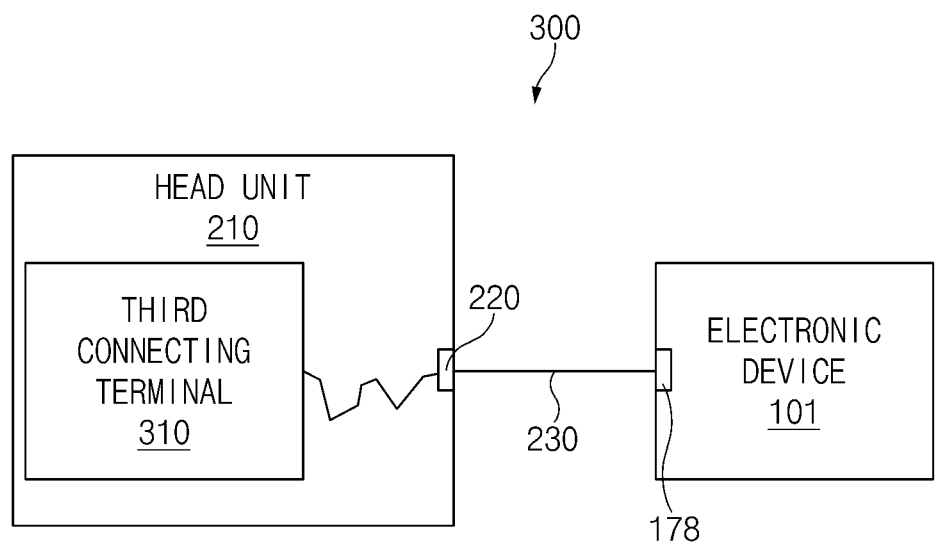
FIG. 3 is a block diagram illustrating a state where an electronic device is connected to a head unit of a vehicle, according to an embodiment.
Figure 4:
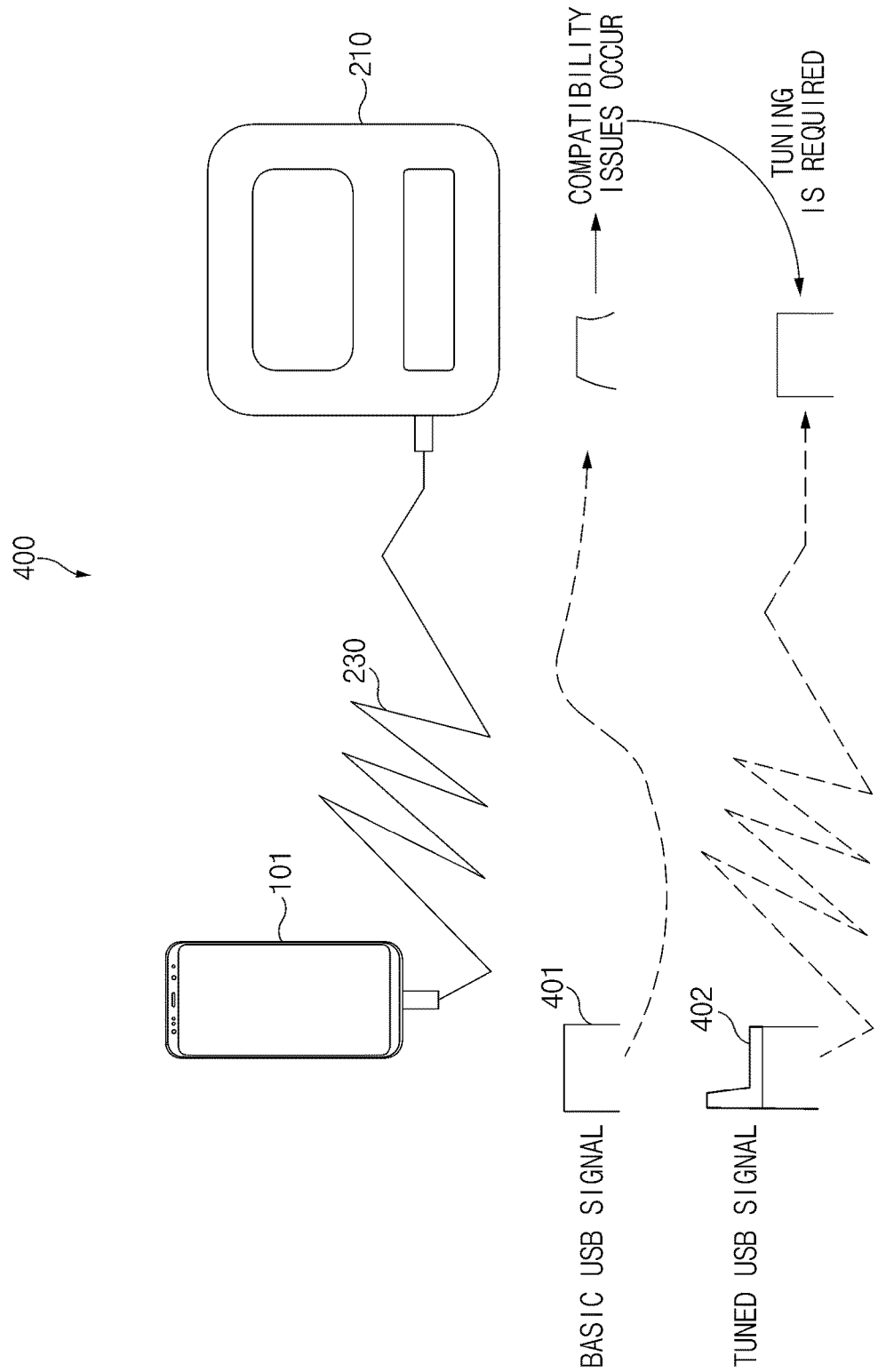
FIG. 4 is a diagram illustrating a communication state between an electronic device and a head unit of a vehicle, according to an embodiment.

Referring to FIG. 3, the electronic device 101 may be connected to the head unit 210 of the vehicle by connecting the client connecting terminal 178 to the vehicle connecting terminal 220 through the cable 230. There may be a USB extension line, which is additionally used inside the vehicle, between the vehicle connecting terminal 220 of the vehicle and a connecting terminal 310 of the head unit 210 (head unit connecting terminal 310) (or third connecting terminal 310).

For example, it may be assumed that a USB connection generally uses a cable of about 1 m. However, in the USB connection between the electronic device 101 and the head unit 210, the total cable length between the head unit 210 and the electronic device 101 may be about 3 m due to a USB extension cable used inside the vehicle.

Due to the length of a USB cable additionally used between the vehicle connecting terminal 220 of the vehicle and the head unit connecting terminal 310, the total cable length between the electronic device 101 and the head unit 210 increases. The increased length, can degrade the stability of the USB communication.

The tuning of a USB tuning register for improving a USB signal of an electronic device will be described with reference to FIG. 4.

The electronic device 101 may be connected to the head unit 210 of the vehicle through the USB cable 230. When the head unit 210 receives a basic USB signal 401 transmitted by the electronic device 101 before tuning, the compatibility may be difficult depending on a connection state (e.g., a length of USB cable, or the like) of the electronic device 101 and the head unit 210. The electronic device 101 may include a tuning register. The electronic device 101 can apply a tuning value to the tuning register. Applying a tuning value to the tuning register improves the signal (USB signal 402) received by the head unit 210. The electronic device 101 may apply at least one tuning value to one tuning register. In this specification, the tuning may be referred to as "physical tuning".

According to an embodiment, the electronic device 101 may have tuning values such as COMP_DIS_TUNE, OTG_TUNE, SQ_RX_TUNE, TX_FS_LS_TUNE, TX_PRE_EMP_AMP_TUNE, TX_PRE_EMP_PULSE_TUNE, TX_RISE_TUNE, TX_VREF_TUNE, TX_HS_XV_TUNE, among others. Accordingly, there may be a difference depending on the application processor. For example, when the electronic device 101 is connected to the head unit 210, tuning values that may be heavily related to signal state improvement may be TX_VREF_TUNE and TX_PRE_EMP_AMP_TUNE. As the electronic device increases tuning value TX_VREF_TUNE, the electronic device may additionally secure a margin of a direct current (DC) level when transmitting a USB signal. As the electronic device increases tuning value TX_PRE_EMP_AMP_TUNE, the electronic device may transmit a signal that is clear by correcting the distortion of the USB signal.

However, the electronic device 101 cannot may all tuning values high. In general, the USB register tuning may be a method of compensating for alternating current (AC) and/or DC components by varying an output of a voltage or current. As the applied tuning value approaches the maximum value, the AC and/or DC component at the corresponding node may increase. The increase can result in electromagnetic interference to an adjacent or nearby electronic device unrelated to the USB communication. Electromagnetic interference may violate the USB standard. Moreover, the current consumed during the USB communication may increase excessively.

Accordingly, it may be necessary to perform a tuning operation to avoid electromagnetic interference and excessive current consumption, while securing the stability of a connection to the head unit 210 (e.g., Android Auto or the like).

Hereinafter, an operating method of an electronic device according to an embodiment will be described with reference to FIGS. 3, 5, 6, and 7.

Figure 5:
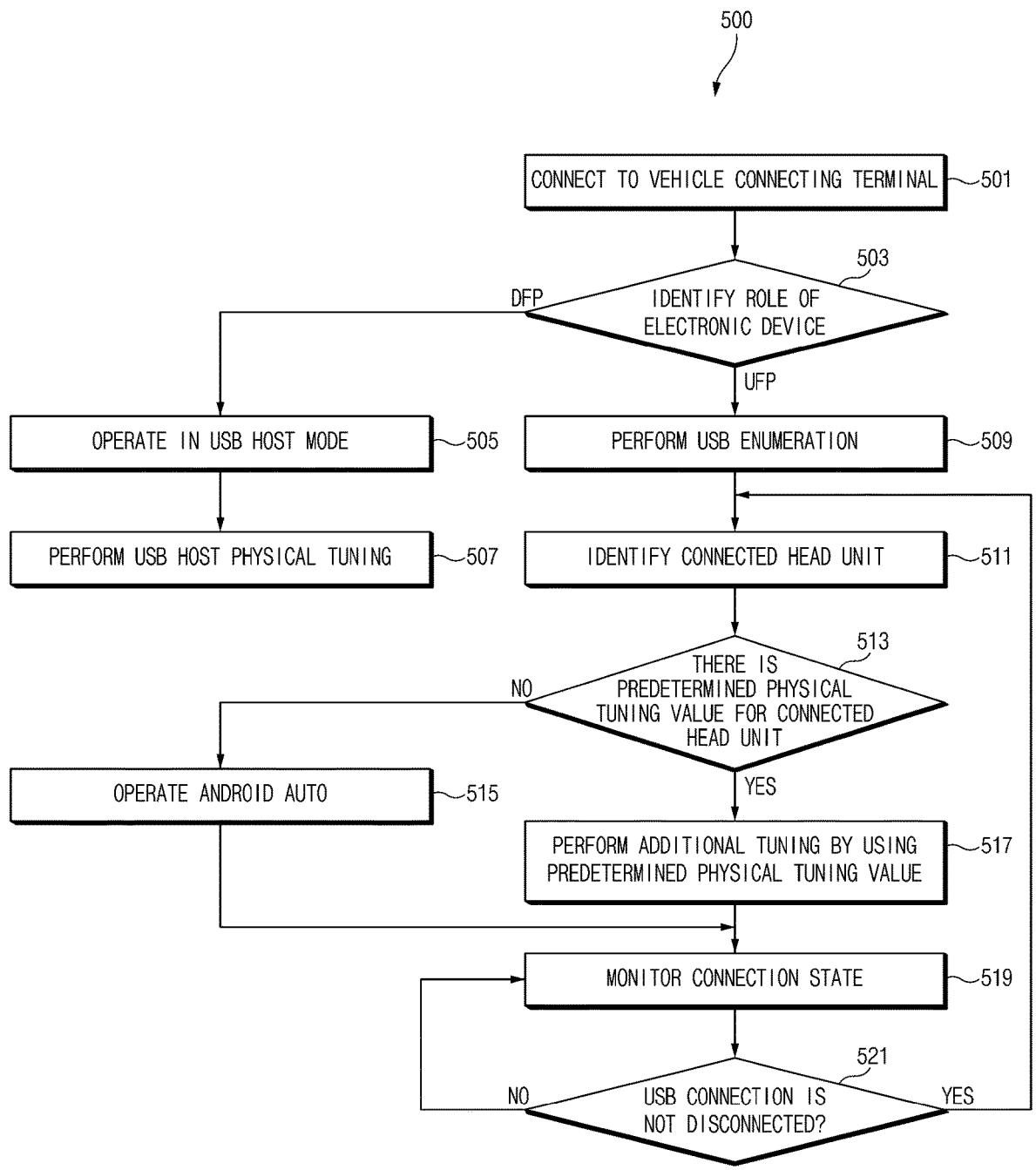
FIG. 5 is a flowchart illustrating an operating method of an electronic device, according to an embodiment.
Figure 6:
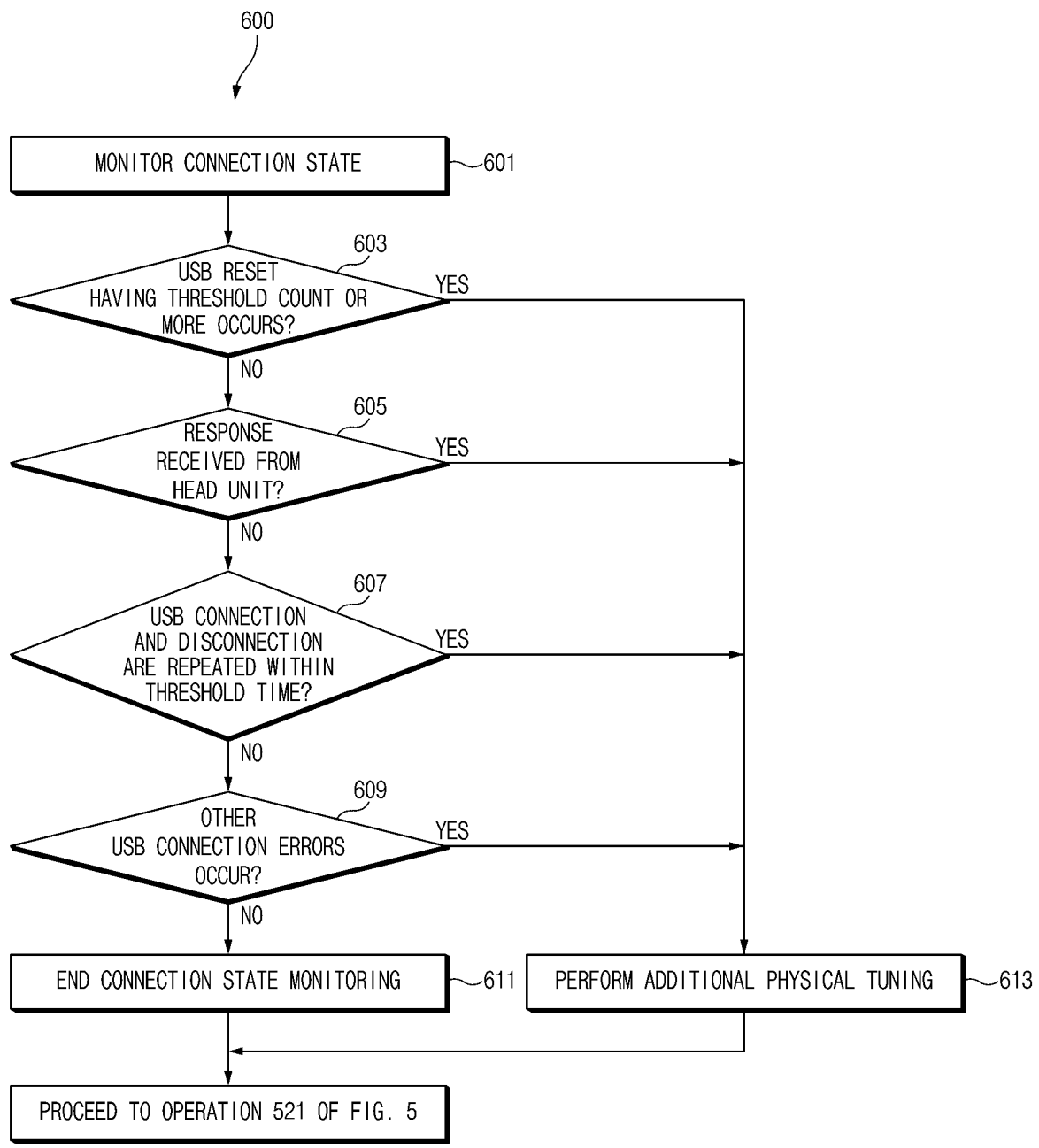
FIG. 6 is a flowchart illustrating an operating method of an electronic device, according to an embodiment.

FIG. 5 may be a flowchart 500 illustrating a method of operating an electronic device, according to an embodiment. FIG. 6 may be a flowchart 600 illustrating a method of operating an electronic device, according to an embodiment. FIG. 7 may be Table 700 illustrating an example of a tuning value of an electronic device, according to an embodiment.

Referring to FIGS. 3 and 5, in operation 501, the electronic device 101 may determine whether the electronic device 101 is connected to the vehicle connecting terminal 220. The electronic device 101 may be connected to the vehicle connecting terminal 220 with the USB cable 230 through the client connecting terminal 178. The vehicle connecting terminal 220 may be connected to the head unit connecting terminal 310 of the head unit 210 inside the vehicle.

In operation 503, the electronic device 101 may identify the role of the electronic device 101. The electronic device 101 may obtain information of the connected head unit 210 and may determine whether the client connecting terminal 178 of the electronic device 101 operates as a host port or a client port, through the obtained information.

The electronic device 101 may identify the power role of the head unit connecting terminal 310 of the head unit 210, which is a connected electronic device. When the head unit connecting terminal 310 of the head unit 210 is an upstream facing port (UFP), the client connecting terminal 178 of the electronic device 101 may be a downstream facing port (DFP).

When it is determined that the client connecting terminal 178 of the electronic device 101 is DFP, in operation 505, the electronic device 101 may operate in a USB host mode. The DFP may mean downstream data transmission (lower data transmission) and may mean a port of a host electronic device.

In operation 507, the electronic device 101 may perform USB host physical tuning by using a predetermined tuning value. The tuning in operation 507 may mean the physical tuning described above with reference to FIG. 4.

When it is determined that the client connecting terminal 178 of the electronic device 101 is UFP, in operation 509, the electronic device 101 may operate in a USB accessory mode (a client mode). The UFP may mean a port of a client device that receives data. The electronic device 101 may perform first tuning by using a predetermined tuning value. The tuning in operation 509 may mean the physical tuning described above with reference to FIG. 4.

In operation 509, the electronic device 101 may perform USB enumeration. The head unit 210 may deliver metadata to the electronic device 101. The head unit 210 may deliver the metadata to the electronic device 101 by wire or wirelessly (e.g., Bluetooth communication).

In operation 511, the electronic device 101 may identify the connected electronic device through the metadata received from the head unit 210. The electronic device 101 may determine whether there is a need for additional tuning, based on the metadata.

In operation 513, the electronic device 101 may determine whether there is a specified physical tuning value for the connected head unit 210. The tuning value calculated in advance for each vehicle model or for each type of a head unit mounted on a vehicle may be stored in a memory of the electronic device 101 in a form of a table.

In certain embodiments, the electronic device 101 may receive tuning values for a variety of vehicles from a predetermined website that collects tuning values from individual auto manufacturers. In other embodiments, the electronic device 101 may determine over a period of time the make and model of the automobiles that the user owns, and download tuning values from a website associated with the manufacturer of the user's automobile.

The tuning value table may be a measurement value. The electronic device 101 may download the tuning value table from a server or the head unit 210. When the electronic device 101 is released, the tuning value table may be stored in the memory of the electronic device 101. The tuning value table may include tuning values for at least one vehicle head unit for which a USB connection error has been previously reported.

When it is determined that there is no tuning value for the connected head unit 210, in operation 515, the electronic device 101 may operate Android Auto without second tuning.

When it is determined that there is a tuning value for the connected head unit 210, in operation 517, the electronic device 101 may perform additional tuning by using the specified physical tuning value thus stored.

In operation 519, the electronic device 101 may monitor the connection state with the head unit 210. Hereinafter, according to an embodiment, a method in which the electronic device 101 monitors a USB connection state will be described with reference to FIG. 6.

Referring to FIG. 6, in operation 601, the electronic device 101 may monitor a connection state with the head unit 210.

In operation 603, the electronic device 101 may determine whether a USB reset having a threshold count or more has occurred. When signal quality is degraded due to the influence of the electronic device 101, the head unit 210, or the cable 230, the USB connection may be reset. According to an embodiment, when reset occurrences of 4 times or more are delivered per second to the head unit 210, the electronic device 101 may determine that an error has occurred in the USB connection state. However, the corresponding numerical value is only an example and is not limited thereto.

When it is determined, in operation 603, that the USB reset having a threshold count or more has not occurred, a procedure may proceed to operation 605. When it is determined that the USB reset having a threshold count or more has occurred, the procedure may proceed to operation 613 and then the electronic device 101 may perform additional tuning.

In operation 605, the electronic device 101 may determine whether a response to data transmission is received from the head unit 210.

When it is determined, in operation 605 (YES), that the response to data transmission is received from the head unit 210, the procedure may proceed to operation 607. When it is determined that the response to data transmission is not received from the head unit 210 (NO), the procedure may proceed to operation 613 and then the electronic device 101 may perform additional tuning.

In operation 607, the electronic device 101 may determine whether USB connection and disconnection are repeated within a threshold time. When the USB connection and disconnection are repeated within 500 ms, the electronic device 101 may determine that an error has occurred in the USB connection state.

When it is determined, in operation 607, that the USB connection and disconnection are not repeated within the threshold time, the procedure may proceed to operation 609. When it is determined that the USB connection and disconnection are repeated within the threshold time, the procedure may proceed to operation 613 and then the electronic device 101 may perform additional tuning.

In operation 609, the electronic device 101 may determine whether other USB connection errors have occurred. According to an embodiment, when a reset or another abnormal event occurs due to unknown heat, the electronic device 101 may determine that an error has occurred in the USB connection state. According to an embodiment, when there is a poor physical contact between a plug of the cable 230 and the connecting terminals (178, 220) due to shaking while a vehicle is driven, the electronic device 101 may determine that an error has occurred in the USB connection state.

When it is determined, in operation 609, that other USB connection errors have not occurred, the procedure may proceed to operation 611 and then the electronic device 101 may end connection state monitoring. When it is determined that the USB connection and disconnection are repeated within the threshold time, the procedure may proceed to operation 613 and then the electronic device 101 may perform additional tuning.

The connection state monitoring item of FIG. 6 is only an example. According to an embodiment, the connection state monitoring item of FIG. 6 may be added or omitted. The monitoring order may also be changed.

When it is determined that there is no error in the connection state in all monitoring items (when the results of operation 603, operation 605, operation 607, and operation 609 are all "NO"), the electronic device 101 may end connection state monitoring in operation 611.

When it is determined that there is an error in the connection state in at least one item among the monitoring items (when at least one of the results of operation 603, operation 607, and operation 609 is "YES", or operation 605 is "NO"), the electronic device 101 may perform additional tuning in operation 613. In operation 613, the electronic device 101 may perform additional tuning by securing the combination of tuning values that is capable of strengthening a USB signal for tuning.

When the connection state monitoring is terminated in operation 611 or additional physical tuning is performed in operation 613, the procedure may proceed to operation 521 of FIG. 5. It may be determined, in operation 521 of FIG. 5, whether the USB connection is disconnected. When the USB connection is not disconnected, the connection state monitoring of operation 519 may be repeated again and performed. When the USB connection is disconnected in operation 521, the procedure may return to operation 511 and then may identify a head unit that is connected again.

Hereinafter, a method in which the electronic device 101 determines a tuning value for third tuning in operation 613 will be described with reference to FIG. 7. FIG. 7 may be Table 700 from actually measuring a result of applying a tuning value to a specific application processor (AP).

Referring to FIG. 7, the electronic device 101 according to an embodiment may apply tuning value TX_VREF_TUNE (hereinafter, referred to as a "first tuning value") to a tuning register.

The tuning register may have 8 bits. The last four bits may indicate TX_VREF_TUNE, the first two bits may indicate TX_PRE_EMP_AMP_TUNE (note that values 0, 4, 8, and C, indicate 0000, 0100, 1000, and 1100), the third and fourth bits indicate TXRESTUNE (note that 0, 1, 2, and 3 refer to 00, 01, 10, and 11, which can be appending to the last two bits of 0, 4, 8, and C).

The first tuning value may use 4 bits in one register having 8 bits. As can be seen from Table 700, for a connection to Android Auto, as the first tuning value increases (from 0×00 to 0×0F), a DC level may increase (from below 400 mV to 506.8 mV) and thus a signal may be strong.

The electronic device 101 may apply tuning value TX_PRE_EMP_AMP_TUNE (hereinafter, referred to as a "second tuning value") to the tuning register. The second tuning value may use 2 bits in one register having 8 bits. As can be seen from Table 700, for a connection to Android Auto, when the second tuning value is 0×00 (corresponding to 8 mA), an AC level may be highest. As the second tuning value increases (from 0×40 to 0×C0) other than 0×00, an AC level may increase (from 2 mA to 6 mA), and thus a signal may be stronger.

Accordingly, when the final register value 0×0F, which has the strongest signal (506.8 mV, 8 mA) and which is obtained by combining the first tuning value 0×0F and the second tuning value 0×00 is applied, tuning may be possible by using the strongest USB signal.

For example, when the first tuning value of 0×05 and the second tuning value of 0×80 are applied, the final register value may be 0×85. Furthermore, when the first tuning value of 0×0A and the second tuning value of 0×C0 are applied, the final register value may be 0×CA. Moreover, when the first tuning value of 0×0F and the second tuning value of 0×00 are applied, the final register value may be 0×0F. Referring to Table 700, it may be seen that the USB signal becomes strong as the final register value goes to 0×85, 0×CA, or 0×0F.

The electronic device 101 may apply tuning value TXRESTUNE (hereinafter, referred to as a "third tuning value") to the tuning register. The third tuning value may be applied to a specific bit allocated for the third tuning value of the tuning register. As can be seen from Table 700, for a connection to Android Auto, as the third tuning value increases (from 0×0 to 0×3), impedance may decrease and thus a signal may be strong. Besides, as the third tuning value increases, the third tuning value may be advantageous for Android Auto.

Table 700 may be stored in the memory of the electronic device 101. The electronic device 101 may determine the optimal combination for strengthening a USB signal and then may perform tuning by using at least one tuning value. Alternatively, according to an embodiment, the optimal combination for strengthening the USB signal may also be stored in a memory of the electronic device 101.

Table 700 may be obtained by measuring a result from applying a tuning value in a condition that a specific application processor is connected to Android Auto. The content of Table 700 may vary depending on an application processor mounted in the electronic device 101. Also, Table 700 of at least one tuning value may be stored in the electronic device 101 for each operating system.

Furthermore, for Table 700, as the tuning value increases in a connection state of Android Auto, a USB signal may be strong. However, the tuning value may be inversely proportional to the magnitude of the USB signal depending on the design of the register and/or the connected operating system. In addition, a signal may be strongest when the tuning value is a specific value regardless of the regularity of direct/inverse proportion.

Figure 8:
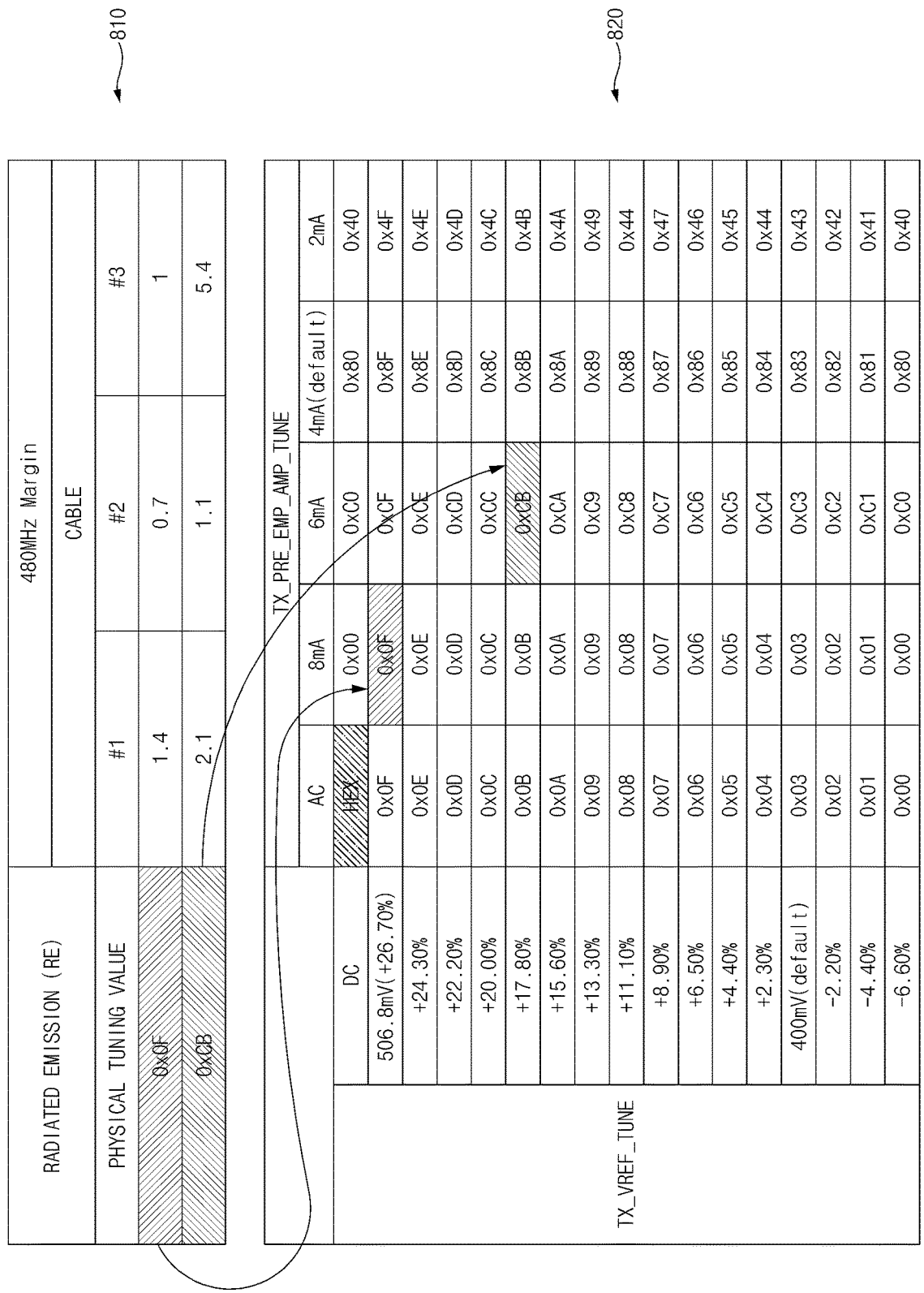
FIG. 8 is a diagram for describing an effect of an electronic device, according to an embodiment.

Referring to Table 1 810 of FIG. 8, as long as data on connection errors of the connected head unit 210 is stored in the electronic device 101, or a connection issue is detected through real-time connection state monitoring, the electronic device 101 according to an embodiment of the disclosure may adjust AC/DC components by applying additional tuning. Accordingly, while electromagnetic interference with an external electronic device is avoided, a TX margin may be improved through the eye pattern of a USB signal. The radiated emission (RE) may be an item included in an EMI category and may mean an extent to which an external electronic device is affected by being delivered in a wireless form within a space.

Referring to Table 1 810 of FIG. 8, as the physical tuning value is adjusted from 0×0F to 0×CB in a state where an RE margin is secured at 480 MHZ, it may be seen that TX margin values of cable #1, cable #2, and cable #3 are improved. Table 2 820 of FIG. 8 may be the same as Table 700 of FIG. 7, and a description thereof may be omitted.

Table 2 920 of FIG. 9 is a table illustrating an eye pattern according to physical tuning values (a final register value from combining tuning value TX_VREF_TUNE and tuning value TXPREEMPAMP) of Table 1 910 of FIG. 9. Table 1 910 of FIG. 9 may be the same as Table 700 of FIG. 7, and thus a description thereof may be omitted. However, a value given on a right side of the physical tuning value of Table 1 910 of FIG. 9 may mean current consumption.

Referring to Table 2 920 of FIG. 9, all of the physical tuning values 0×0F, 0×4F, and 0×84 may have an eye pattern having a specific quality or higher. The electronic device 101 may improve current consumption by adjusting the physical tuning value at a level at which the eye pattern satisfies specific quality. Referring to Table 1 910 of FIG. 9, when the physical tuning value is changed from 0×0F to 0×84, the current consumption may be improved from 19.14 mA to 12.99 mA by 6.15 mA.

Figure 10:
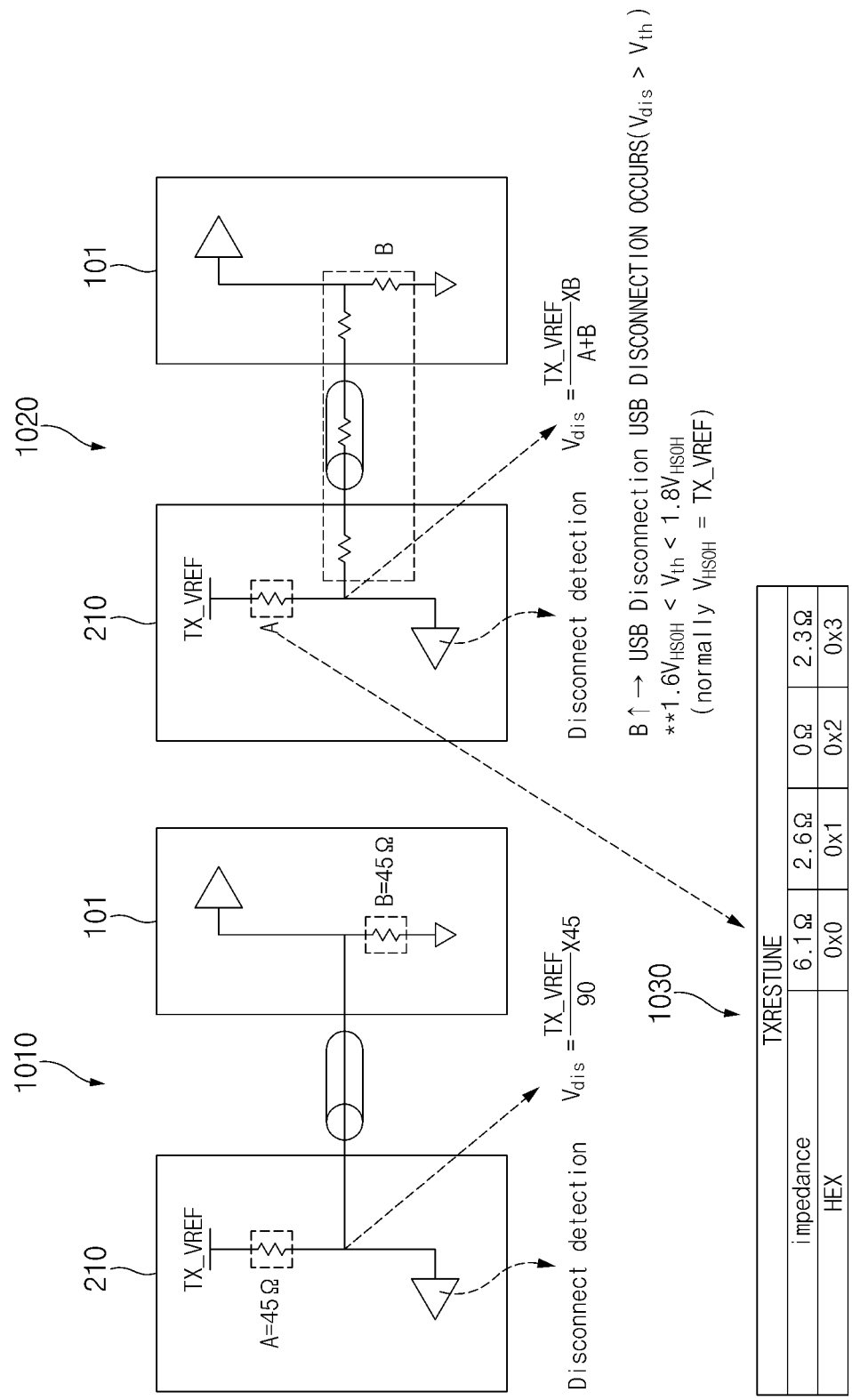
FIG. 10 is a diagram for describing an effect of an electronic device, according to an embodiment.

A first circuit diagram 1010 of FIG. 10 may be a circuit diagram illustrating an ideal connection between the electronic device 101 and the head unit 210. A second circuit diagram 1020 of FIG. 10 may be a circuit diagram illustrating a general connection between the electronic device 101 and the head unit 210. Table 1030 of FIG. 10 may be a table illustrating tuning value TXRESTUNE applied to a tuning register by the electronic device 101. According to an embodiment, the electronic device 101 may apply tuning value TXRESTUNE to tuning register A. According to an embodiment, tuning value TXRESTUNE may be applied to a specific bit allocated for the tuning value TXRESTUNE of tuning register A. According to an embodiment, as can be seen from Table 1030, for a connection to Android Auto, as tuning value TXRESTUNE increases (from 0×0 to 0×3), impedance may decrease and thus a signal may be strong. Accordingly, as tuning value TXRESTUNE increases, it may be advantageous for Android Auto, thereby improving connection stability and improving additional current consumption.

According to an embodiment of the disclosure, when the connected head unit has a model, in which a connection error is previously reported, or a connection issue is detected through real-time connection state monitoring, an electronic device may perform additional tuning, thereby improving issues caused by tuning that was fixedly performed by using an existing fixed value, reducing an issue of connection instability by strengthening a USB signal, and solving USB communication errors.

According to an embodiment of the disclosure, an electronic device and the operating method of the electronic device may not be limited to a USB connection, and may be applied to various interfaces such as PCIe, Lightning cable, HDMI, DisplayPort, and the like.

According to an embodiment of the disclosure, an electronic device may include a connecting terminal, a memory, and a processor connected to the connecting terminal and the memory. The processor may be configured to identify a head unit of a vehicle connected to the connecting terminal, obtain information about a model of the vehicle or an installed operating system associated with the identified head unit, and when the information about a specified tuning value for the identified head unit is stored in the memory, tune a register by using the specified tuning value.

According to an embodiment of the disclosure, the connecting terminal may be a universal serial bus (USB) connecting terminal.

According to an embodiment of the disclosure, the specified tuning value may be a tuning value applied to at least one bit of the register.

According to an embodiment of the disclosure, the processor may be configured to monitor a connection state between the electronic device and the head unit.

According to an embodiment of the disclosure, the processor may be configured to determine whether a connection has reset at least a threshold count between the electronic device and the head unit.

According to an embodiment of the disclosure, the processor may be configured to determine whether a response to data transmission is not received from the head unit.

According to an embodiment of the disclosure, the processor may be configured to determine whether USB connection and disconnection between the electronic device and the head unit is repeated within a threshold time.

According to an embodiment of the disclosure, the processor may be configured to perform additional tuning on the register to determine whether there is an error in the connection state between the electronic device and the identified head unit.

According to an embodiment of the disclosure, the processor may be configured to select a tuning value, which has a lowest current consumption, from among tuning values having signal quality of at least a specific level based on the information about the tuning value stored in the memory.

According to an embodiment of the disclosure, the processor may be configured to select a tuning value, which satisfies an electro magnetic compatibility (EMC) standard, from among tuning values having signal quality of a specific level or higher based on the information about the tuning value stored in the memory.

According to an embodiment of the disclosure, an operating method of an electronic device may include identifying a head unit of a vehicle, which is connected to a first connecting terminal of the electronic device, obtaining information about a type of the connected head unit, determining whether information about a specified tuning value according to the type of the connected head unit is stored in a memory of the electronic device, and tuning a register by using the specified tuning value when the information about the specified tuning value is stored in the memory.

According to an embodiment of the disclosure, the first connecting terminal may be a universal serial bus (USB) connecting terminal.

According to an embodiment of the disclosure, the type of the head unit may be a model of the vehicle or an operating system installed in the head unit.

According to an embodiment of the disclosure, the operating method may further include monitoring a connection state between the electronic device and the head unit.

According to an embodiment of the disclosure, the operating method may further include determining whether a connection reset having a threshold count or more occurs between the electronic device and the head unit.

According to an embodiment of the disclosure, the operating method may further include determining whether a response to data transmission is not received from the head unit.

According to an embodiment of the disclosure, the operating method may further include determining whether USB connection and disconnection between the electronic device and the head unit is repeated within a threshold time.

According to an embodiment of the disclosure, the operating method may further include performing additional tuning on the register in determining that there is an error in a connection state between the electronic device and the head unit.

According to an embodiment of the disclosure, the operating method may further include selecting a tuning value, which has the lowest current consumption, from among tuning values having signal quality of a specific level or higher based on the information about the tuning value stored in the memory.

According to an embodiment of the disclosure, the operating method may further include selecting a tuning value, which satisfies an EMC standard, from among tuning values having signal quality of a specific level or higher based on the information about the tuning value stored in the memory.

The invention claimed is:

1. An electronic device comprising:
    a connecting port detachably connectable to a head unit of a vehicle;
    a memory storing information for one or more tuning values corresponding to one or more head units of vehicles; and
    a processor connected to the connecting port and the memory,
    wherein the processor is configured to:
    obtain information about a model of the vehicle or an installed operating system, associated with the head unit connected through the connecting port;
    based on the obtained information, determine whether information about a specified tuning value for the connected head unit of the vehicle is stored in the memory among the information for the one or more tuning values corresponding to the one or more head units of vehicles; and
    when the information about the specified tuning value for the connected head unit is stored in the memory, tune a register by using the specified tuning value.

2. The electronic device of claim 1, wherein the connecting port is a universal serial bus (USB) connecting terminal.

3. The electronic device of claim 1, wherein the specified tuning value is a tuning value applied to at least one bit of the register.

4. The electronic device of claim 1, wherein the processor is configured to:
    monitor a connection state between the electronic device and the head unit.

5. The electronic device of claim 4, wherein the processor is configured to:
    determine whether a connection has reset at least a threshold count between the electronic device and the head unit.

6. The electronic device of claim 4, wherein the processor is configured to:
    determine whether a response to data transmission is received from the head unit.

7. The electronic device of claim 4, wherein the processor is configured to:
    determine whether USB connection and disconnection between the electronic device and the head unit is repeated within a threshold time.

8. The electronic device of claim 4, wherein the processor is configured to:
    perform additional tuning on the register to determine whether there is an error in the connection state between the electronic device and the head unit.

9. The electronic device of claim 8, wherein the processor is configured to:
    select a tuning value, which has a lowest current consumption, from among tuning values having signal quality of at least a specific level based on the information about the tuning value stored in the memory.

10. The electronic device of claim 8, wherein the processor is configured to:
    select a tuning value, which satisfies an electromagnetic compatibility (EMC) standard, from among tuning values having signal quality of a specific level or higher based on the information about the tuning value stored in the memory.

11. A method in an electronic device, the method comprising:
    when a head unit of a vehicle is detachably connected through a connecting port of the electronic device, obtaining information about a type of the head unit of the vehicle;
    based on the obtained information, determining whether information about a specified tuning value for the connected head unit of the vehicle is stored in a memory among information for one or more tuning values corresponding to one or more head units of vehicles; and
    when the information about the specified tuning value associated with the type of the head unit is stored in a memory, tuning a register by using the specified tuning value.

12. The method of claim 11, wherein the connecting port a USB connecting terminal.

13. The method of claim 11, wherein the type of the head unit includes an identification of a model of the vehicle or an operating system installed in the head unit.

14. The method of claim 11, further comprising:
    monitoring a connection state between the electronic device and the head unit.

15. The method of claim 14, further comprising:
    determining whether a connection has reset at least a threshold count between the electronic device and the head unit.

16. The method of claim 14, further comprising:
    determining whether a response to data transmission is received from the head unit.

17. The method of claim 14, further comprising:
    determining whether USB connection and disconnection between the electronic device and the head unit is repeated within a threshold time.

18. The method of claim 14, further comprising:
    performing additional tuning on the register to determine whether there is an error in the connection state between the electronic device and the head unit.

19. The method of claim 18, further comprising:
    selecting a tuning value, which has a lowest current consumption, from among tuning values having signal quality of at least a specific level based on the information about the tuning value stored in the memory.

20. The method of claim 18, further comprising:
    selecting a tuning value, which satisfies an electromagnetic compatibility (EMC) standard, from among tuning values having signal quality of a specific level or higher based on the information about the tuning value stored in the memory.

* * * * *